United States Patent [19]

Rathbun

[11] Patent Number: 5,609,894
[45] Date of Patent: Mar. 11, 1997

[54] INJECTION MOLDING APPARATUS FOR PRODUCING PLASTIC LIDS

[75] Inventor: W. John Rathbun, Castalia, Ohio

[73] Assignee: Rathbun Family Real Estate Group, Castalia, Ohio

[21] Appl. No.: 394,959

[22] Filed: Feb. 27, 1995

[51] Int. Cl.⁶ .................................................. B29C 45/44
[52] U.S. Cl. ........................... 425/556; 264/334; 425/577; 425/809; 425/DIG. 58
[58] Field of Search ..................................... 425/577, 809, 425/DIG. 58, 556; 264/334

[56] References Cited

U.S. PATENT DOCUMENTS

| | | | |
|---|---|---|---|
| 4,618,121 | 10/1986 | Conti | 425/DIG. 58 |
| 5,053,182 | 10/1991 | Hedgewick | 425/DIG. 58 |
| 5,383,780 | 1/1995 | McCready et al. | 425/DIG. 58 |

Primary Examiner—Tim Heitbrink
Attorney, Agent, or Firm—Emch, Schaffer, Schaub & Porcello Co., L.P.A.

[57] ABSTRACT

The present invention is a mold apparatus and method for injection molding a plastic part. A cavity mold part defines at least one main cavity. A core mold assembly has surfaces complementary with the main cavities. The core mold assembly includes an outer core mold part having a center opening. An outer ejector part is positioned for movement in the center opening. An inner stem ejector part is positioned within the outer ejector part. The cavity mold part and the core mold assembly are moved together and the thermoplastic material injected to form the plastic part. The cavity mold and the core mold assembly is separated. The outer and inner ejector parts are moved together and away from the outer core mold part. Preferably a stripper part rotates a portion of the formed part. The inner stem ejector part is then moved relative to the outer ejector part and completed plastic parts removed.

4 Claims, 6 Drawing Sheets

5,609,894

INJECTION MOLDING APPARATUS FOR PRODUCING PLASTIC LIDS

BACKGROUND OF THE INVENTION

The present invention is directed to mold apparatus for the injection molding of plastic parts, such as plastic lids. The injection molding of plastic parts and plastic lids is well known in the art. When the desired part includes an in-turned flange or lip, the mold is more complicated and often includes inserts or slides.

In my copending application entitled "Tamper Resistant Lid ", Ser. No. 08/361,297, filed Dec. 22, 1994, a plastic lid is disclosed which includes a top, a downwardly extending skirt and a series of inwardly directed locking ribs, which are circumferentially spaced on the interior of the skirt. Such a plastic lid is illustrated in FIG. 1 of the present drawings.

The present injection mold apparatus and method is directed to a mold apparatus and method which forms a thermoplastic, such as a low or high density polyethylene into the desired plastic lid.

The injection mold apparatus and method of the present invention provide an improvement over that known in the art. The improved mold apparatus allows complex-shaped parts with good dimensional accuracy. The present apparatus and method provides an interior flange on the plastic lid and facilitates the production of such lids at a high production rate.

SUMMARY OF THE INVENTION

The present invention is directed to an injection mold apparatus and method for the molding of plastic parts and particularly lids. The mold apparatus includes a cavity mold part and a core mold assembly which mutually define the desired cavity for the plastic part. The core mold assembly includes an outer core mold part which defines a center opening. The center opening receives an outer ejector part and an inner stem ejector part. The cavity mold part and the core mold assembly form the main cavity and also at least one inwardly directed supplemental cavity for forming the part including an inwardly directed flange or rib. The thermoplastic material is injected into the main cavity and into the supplemental cavities to form the plastic part. The cavity mold is then separated from the core mold assembly. Subsequently the outer ejector part and the inner stem ejector part are moved together away from the outer core mold part. In the preferred embodiment a stripper ring is provided in surrounding relationship with the outer core mold part to engage and rotate a portion of the formed plastic part.

Next, the inner stem is moved relative to the outer ejector part to separate the plastic part from the outer ejector part. The completed lid may then be removed from the injection mold apparatus for the beginning of another cycle.

DESCRIPTION OF THE PREFERRED EMBODIMENTS

Figure 1:
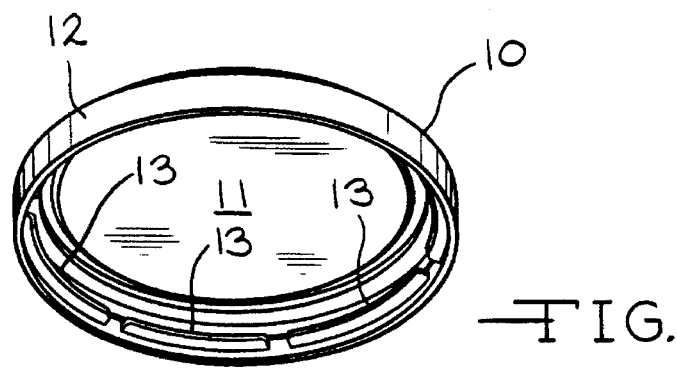
FIG. 1 is a perspective view illustrating a plastic lid to be formed by an injection mold apparatus and method, according to the present invention.

A plastic lid 10 is illustrated in FIG. 1. The plastic lid 10 is constructed of a thermoplastic material. Preferably, the thermoplastic material is a high density polyethylene. Other thermoplastics, including low density polyethylenes may be utilized and fall within the scope of the present invention. The plastic lid 10 is constructed in accordance with the Tamper Resistant Lid, disclosed in U.S. Application Ser. No. 08/361,2971 , filed Dec. 22, 1994, and incorporated herein by reference.

The plastic lid 10 includes a top 11 and a downwardly extending skirt 12. A plurality of ribs or flanges 13 extend inwardly from the skirt 12.

Figure 7:
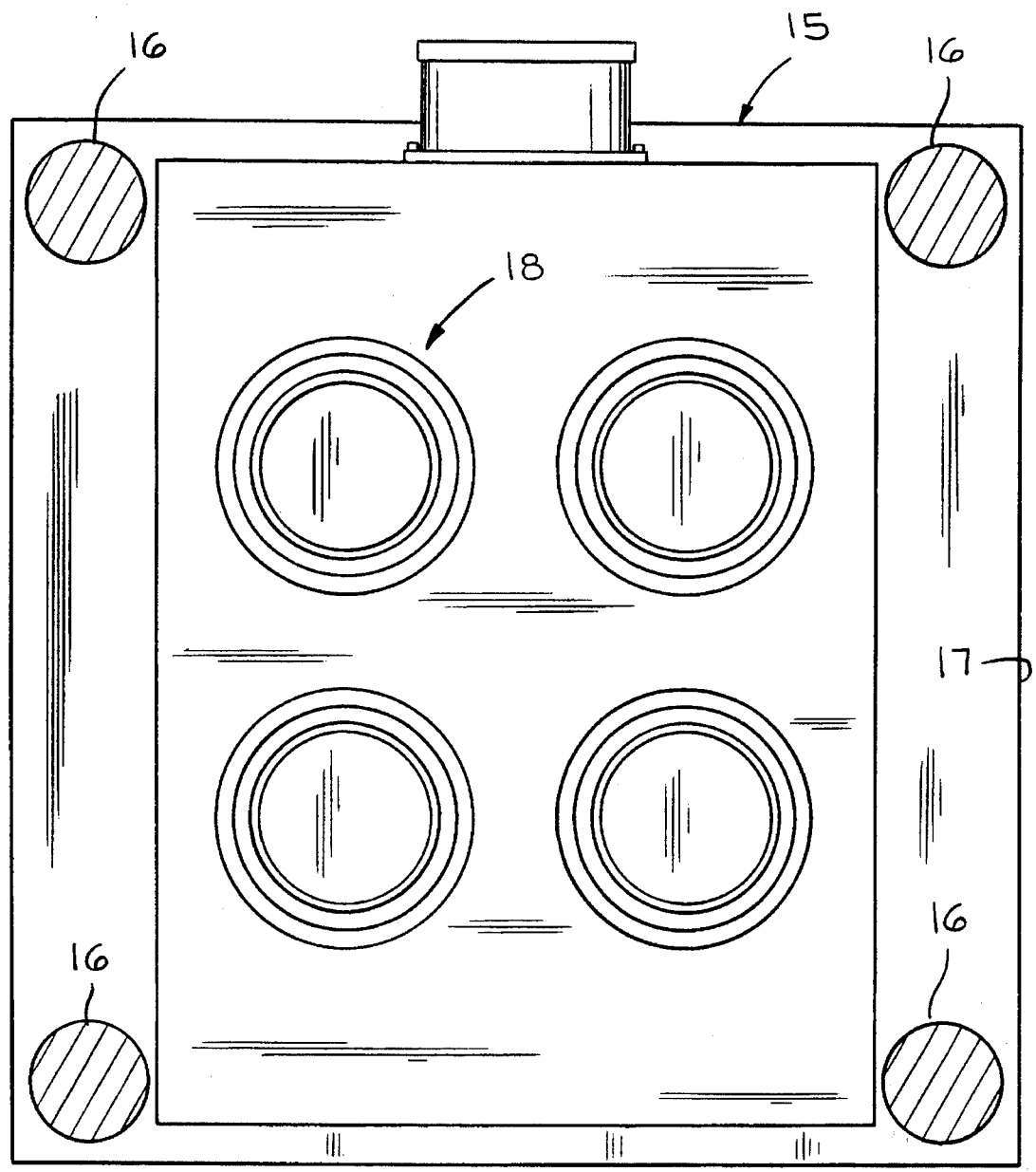
FIG. 7 is a fragmentary view of a portion of the injection molding machine showing a four cavity mold apparatus, according to the present invention.

Referring to FIG. 7, an injection molding machine 15 having a plurality of tie bars 16 is illustrated. A movable platen 17 is supported on the tie bar 16 in a conventional manner and mounts an injection mold apparatus 18, according to the present invention. In the present embodiment, the mold 18 is a four cavity mold. However, single cavity molds and multiple cavity molds all fall within the scope of the present invention.

FIGS. 2–5 illustrate the structure and operation of the injection mold apparatus 18. The injection molding machine 15 includes a channel 19, a nozzle housing 20 and an injection nozzle 21. The injection mold apparatus 18 includes A cavity mold part 23 which defines a cavity 24. The cavity mold part 23 is mounted by a mold backing plate 25. The cavity mold 23 includes a sprue bushing 26 which receives the injection nozzle 21 in a conventional manner.

The injection mold apparatus 18, according to the present invention, includes a core mold assembly 28 which defines a surface 29 complementary with the cavity 24 of the cavity mold part 23. The core mold assembly 28 also includes an outer core part 30 which defines a center opening 31. In the present embodiment the outer core mold part 30 is generally ring-shaped, however it can be of differing configurations. Also in the preferred embodiment a generally circular stripper part 32 having a stripper surface 33 surrounds the outer core mold part 30.

The core mold assembly 28, in addition to the outer core mold part 30, includes an outer ejector part 34 positioned for movement within the center opening 31 of the outer core mold part 30 and an inner stem ejector part 36 positioned within the outer ejector part 34.

Figure 2:
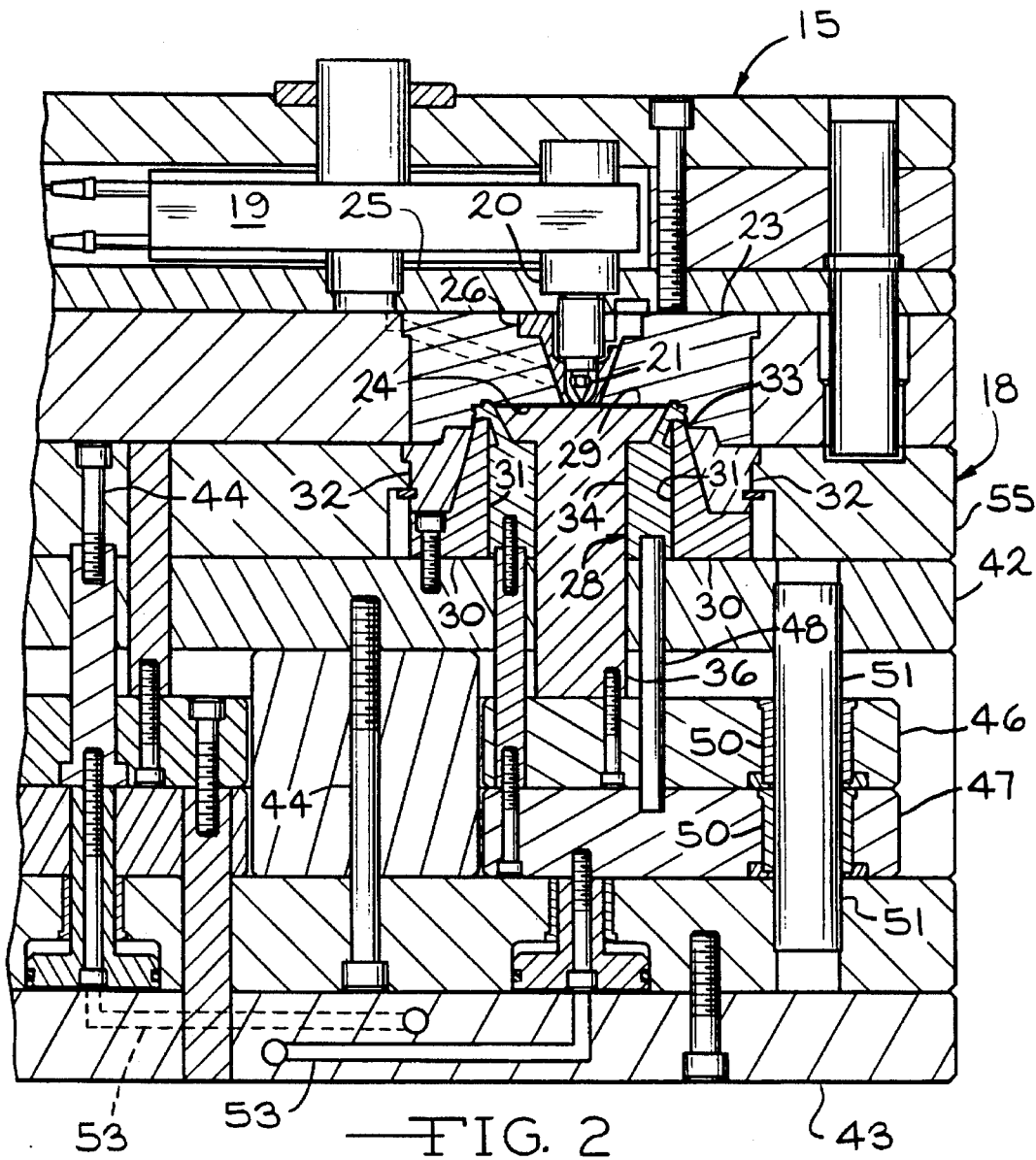
FIG. 2 is a fragmentary sectional view of a portion of the injection molding machine and the injection mold, according to the present invention.
Figure 3:
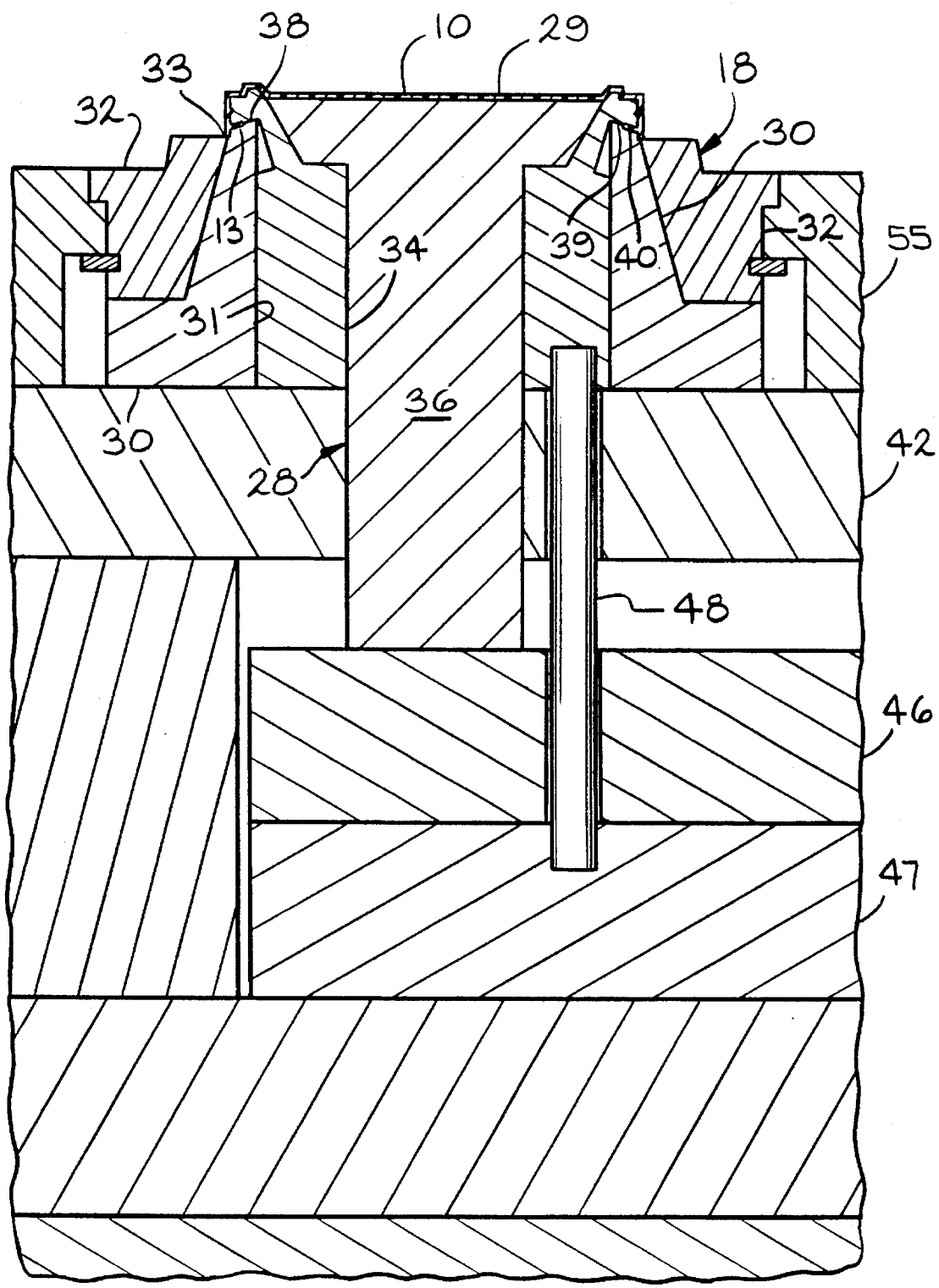
FIG. 3 is an enlarged fragmentary view of the injection mold apparatus, according to the present invention, with the cavity mold part removed subsequent to the formation of the plastic lid.

Referring to FIG. 3, a portion or portions 38 of the outer core mold part 30 and a portion or portions 39 of the outer ejector part 34 define a plurality of supplemental cavities 40 which define the size and shape of the flanges 13 of the plastic lid 10. Referring to FIG. 2, the core mold assembly 28 is mounted by typical injection mold components including an intermediate support plate 42. A plurality of spacers are mounted between the intermediate support plate 42 and an outer frame plate 43. A plurality of bolts 44 of various sizes interconnect the components. In the present embodiment, driven ejector plates 46 and 47 are operatively connected adjacent to and in driving relationship with the inner stem ejector part 36. A drive pin 48 extends from the ejector plate 47 through the ejector plate 46 and the intermediate mold plate 42 to a connecting relationship with the outer ejector part 34. The drive pin 48 is free to move relative to the intermediate mold plate 42 and the ejector plate 46. Referring to FIG. 2, the ejector plates 46 and 47 include bushings 50 mounted for guiding movement along a guide rod 51. Fluid channels 53 are provided to supply pressure fluids to the injection mold apparatus 18 to drive components such as the ejector plate 47.

A drive arm 55 is connected to a cylinder and to the stripper part 32, for movement of the circular stripper part 32. The ejector plate 47 is pneumatically operated, for example by an air cylinder to move the ejector plate 47 in the desired sequence, discussed below.

While the parts of the above disclosed injection mold apparatus 18 have been discussed with respect to a multi-cavity mold and discussed in connection with a particular alignments, the number of mold cavities may be revised and the parts reversed, without departing from the scope of the claims or of the present invention.

Referring to FIGS. 2–6 and particularly to FIGS. 3–6, the operation of the mold apparatus 18 is illustrated. The improved method is as follows.

The injection molding machine 15 is closed with each of the cavity mold parts 23 of the injection mold apparatus 18 positioned adjacent the respective core mold assemblies 28 thereby defining the cavities 24 for forming the plastic lids 10. In the four cavity unit illustrated in FIG. 7, four plastic lids 10 are produced in a preferred seven and one-half second cycle. The thermoplastic material is introduced through the injection nozzle 21 into the respective cavities 24.

Initially the cavity mold part 23 and the core mold assembly 28 are moved together to form the main cavity 24 and the inwardly directed supplemental cavities 40, which define the flanges 13.

The thermoplastic material is injected into the main cavity 24 and into the supplemental cavities 40 to form the plastic lid 10.

The cavity mold part 23 is separated from the core mold assembly 28 after cooling of the material.

Figure 4:
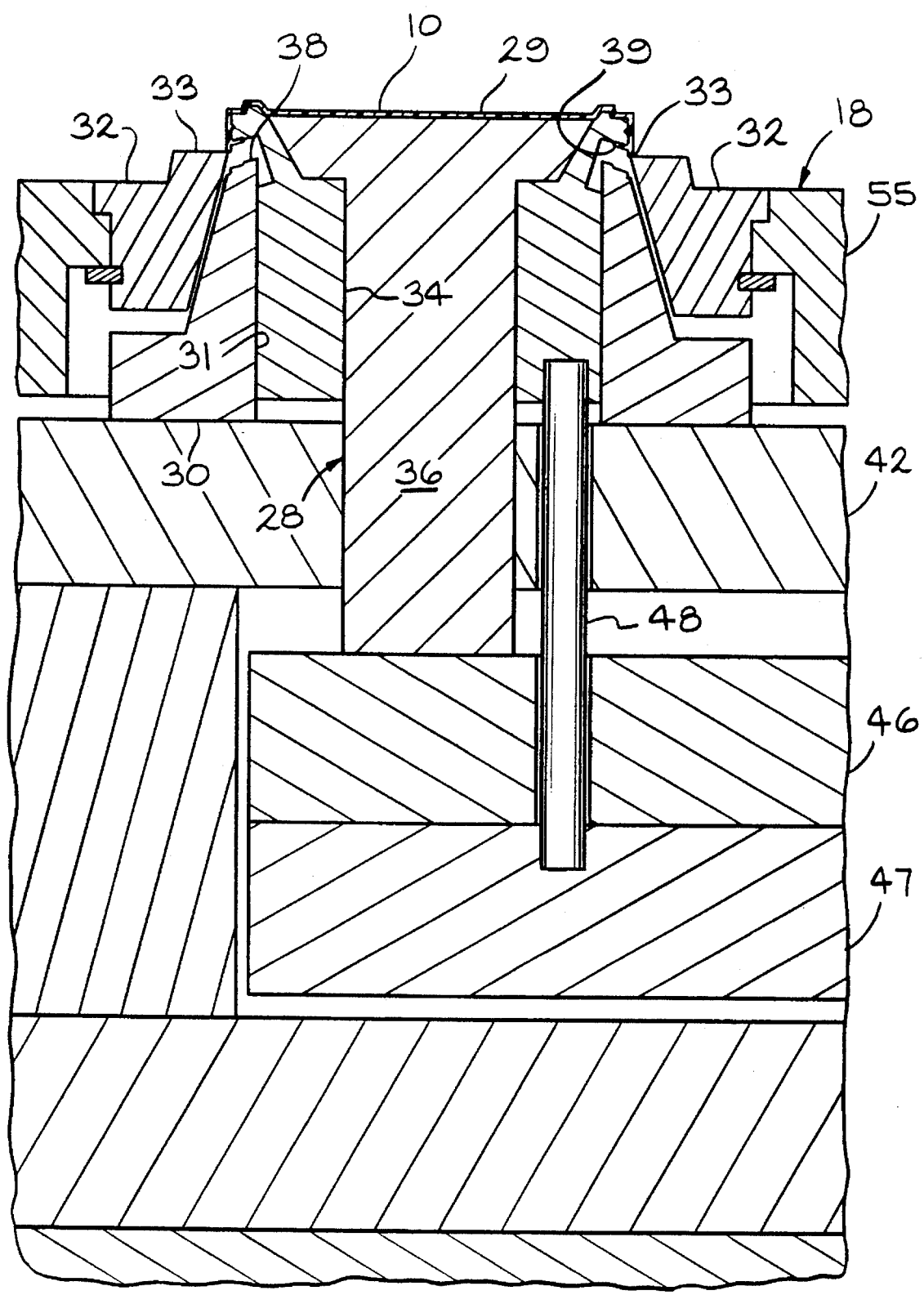
FIG. 4 is a view similar to FIG. 3 showing the outer ejector part and the inner stem ejector part moved upwardly.
Figure 5:
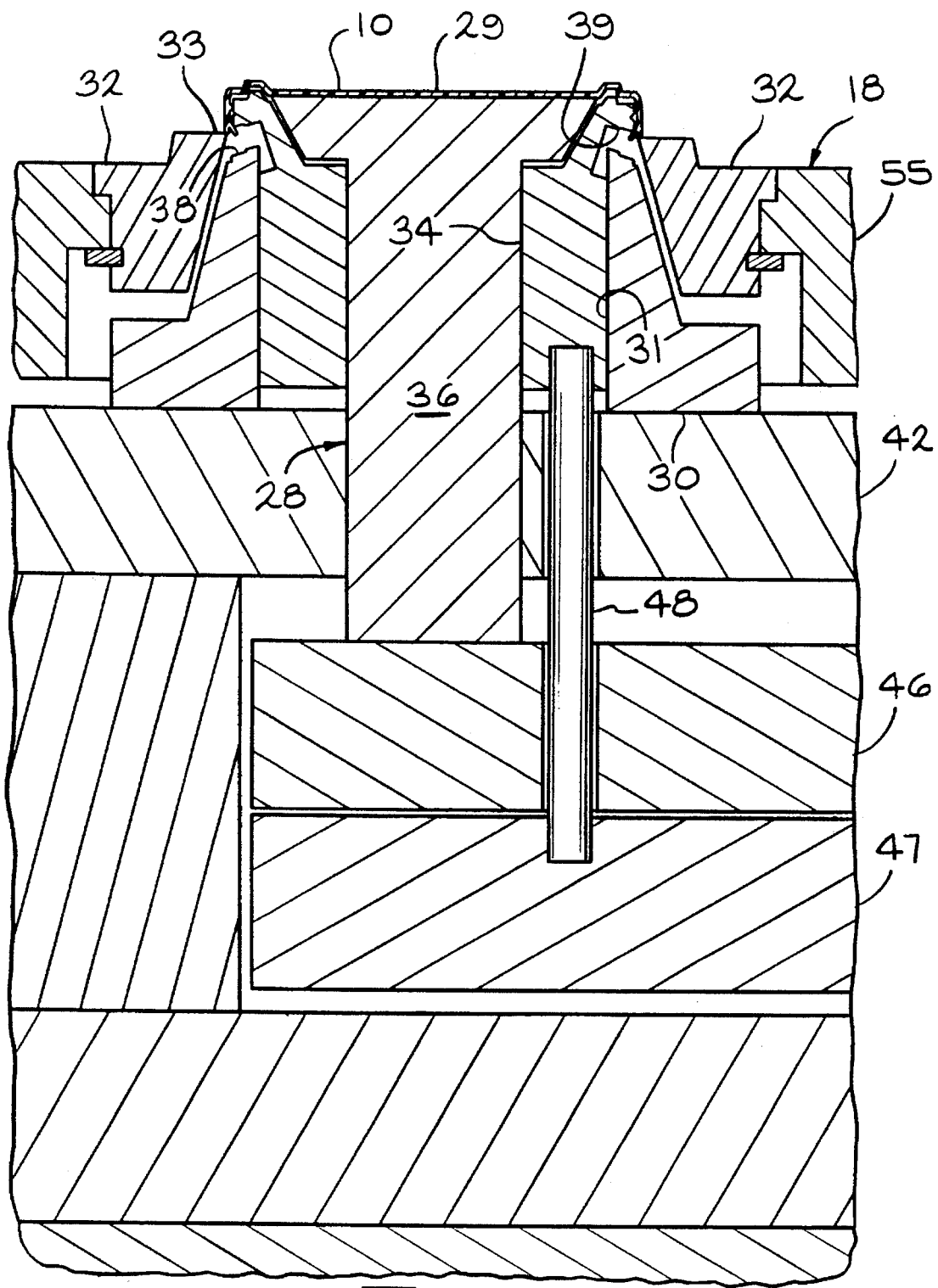
FIG. 5 is a view similar to FIG. 4 showing the stripper ring moved into engagement with a portion of the formed plastic lid.
Figure 6:
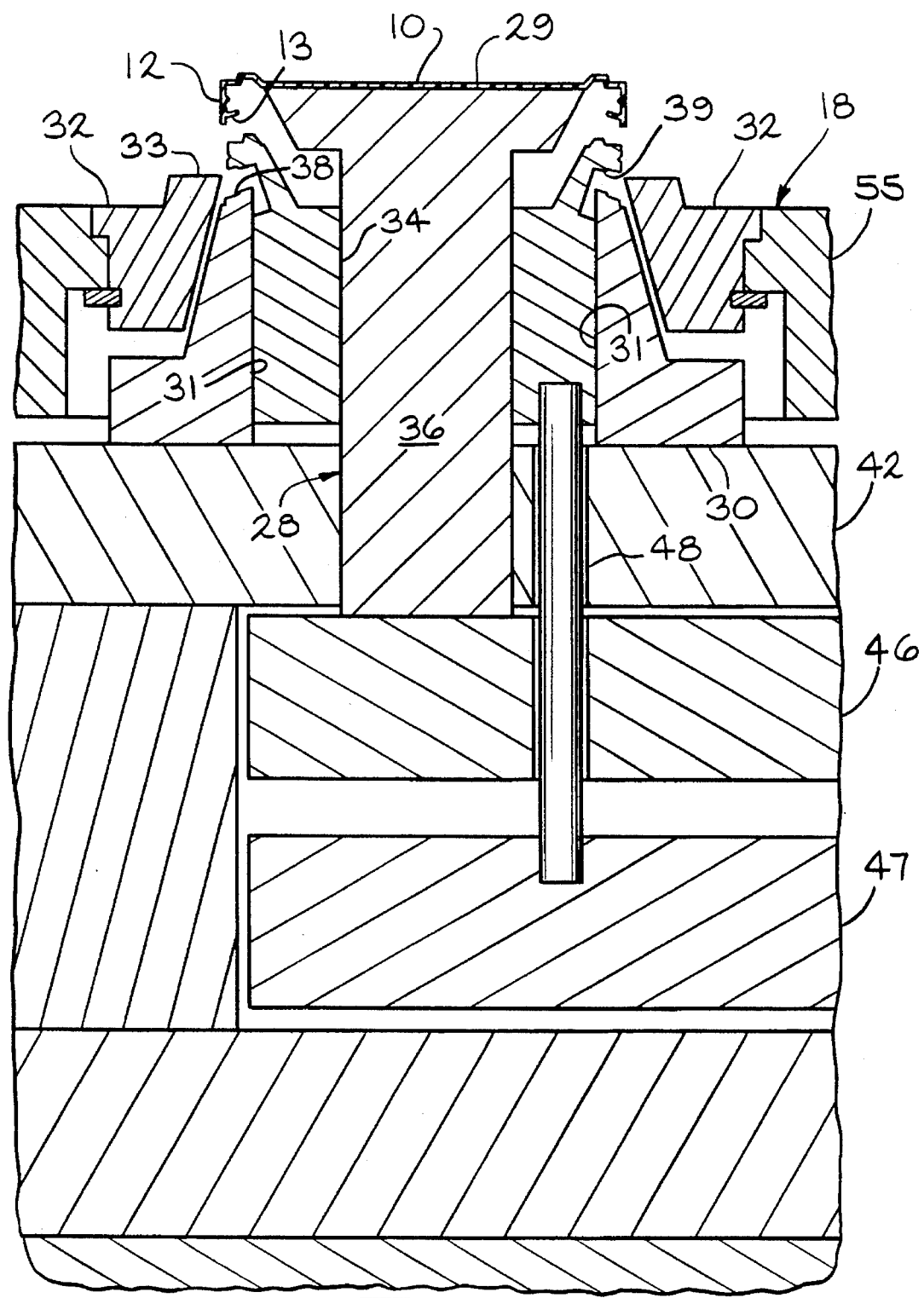
FIG. 6 is a view similar to FIG. 5 showing the inner stem ejector part moved away from the outer ejector part.

Referring to FIG. 3, the injection mold apparatus 10 is shown after the cavity mold part 23 has been separated. Pneumatic pressure moves the ejector plate 47. This moves the outer ejector part 34 and the inner stem ejector part 36 away from the outer core part 30, as shown in FIG. 4. The portion 38 of the outer core mold part 30 is separated from the portion 39 of the outer ejector part 34. The drive arm 55 and the attached stripper part 32, which in the present embodiment has a ring-shaped stripper edge or surface 33, is also moved upwardly so that the surface 33 is adjacent the skirt 12 of the plastic lid 10. The stripper ring surface 33 engages and rotates a portion of the plastic lid 10, such that the flanges 30 are rotated outwardly from beneath the circular portion 39 of the outer ejector part 34. The ejector plate 46 is pneumatically advanced to move the inner stem ejector part 36 relative to the outer ejector part 34. This separates the plastic lid 10 from the outer ejector part 34, as shown in FIG. 6. Lastly, the completed plastic lid 10 is removed from the injection mold apparatus 18. Preferably a jet of air is delivered through the inner stem ejector part 36 to remove the plastic lids 10.

The cycle is then repeated.

Many revisions may be made to the above described preferred embodiment without departing from the scope of the present invention or from the following claims.

I claim:

1. A mold apparatus for injection molding of plastic parts having tops and depending skirts comprising, a cavity mold part defining at least one main cavity for one of said plastic parts, a core mold assembly complementary with said cavity mold part, said core mold assembly including an outer core mold part defining a center opening, an outer ejector part positioned for movement within said center opening of said outer core mold part, said outer ejector part and said outer core mold part defining at least one supplemental sidewall cavity in communication with said main cavity, and an inner stem ejector part positioned within said outer ejector part, said outer ejector part and said inner stem ejector part being movable relative to said outer core mold part and also relative to one another, means for moving said outer core mold part and said outer ejector part between a molding position defining said at least one supplemental sidewall cavity and an open position wherein said outer core mold part and said outer rejector part are separated, a stripper part positioned adjacent said outer core mold part, means for moving said stripper part into engagement with such skirt of such one of such plastic parts when said outer core mold part and said outer ejector part are in such open position to rotate and move said plastic part from said at least one supplemental sidewall cavity.

2. A mold apparatus, according to claim 1, wherein said outer core mold part and said outer ejector part define a plurality of supplemental sidewall cavities extending inwardly from said main cavity.

3. A mold apparatus, according to claim 1 wherein said stripper part positioned adjacent said outer core mold part is generally circular.

4. A mold apparatus, according to claim 1, wherein said cavity mold part defines a plurality of main cavities and said core mold assembly comprising a plurality of core mold parts, outer ejector parts and inner stem ejector parts complementary with said plurality of main cavities.

\* \* \* \* \*